United States Patent [19]

Coope

[11] 4,403,389
[45] Sep. 13, 1983

[54] SLIDE MECHANISM

[75] Inventor: Robert L. Coope, Phoenix, Ariz.

[73] Assignee: Stevens Engineering, Inc., Phoenix, Ariz.

[21] Appl. No.: 231,896

[22] Filed: Feb. 5, 1981

[51] Int. Cl.³ .............................................. B23Q 1/14
[52] U.S. Cl. ..................................... 29/561; 248/657; 269/281; 409/219
[58] Field of Search ................... 409/219; 29/561, 51; 408/62, 69, 91; 269/58, 250, 251; 248/656, 657, 178; 108/137, 143

[56] References Cited

U.S. PATENT DOCUMENTS

| | | | |
|---|---|---|---|
| 1,379,747 | 5/1921 | Cumner | 269/251 X |
| 1,558,742 | 10/1925 | Maszczyk | 269/251 X |
| 1,648,441 | 11/1927 | Brower | 409/219 X |
| 1,926,392 | 9/1933 | Kritzer | 248/657 |
| 1,930,567 | 10/1933 | Shaw et al. | 409/219 |
| 2,052,271 | 8/1936 | Archea | 409/219 X |
| 2,861,492 | 11/1958 | Hokanson | 269/251 X |
| 3,312,461 | 4/1967 | Copron | 269/250 X |
| 3,823,904 | 7/1974 | Stenger | 248/656 |

FOREIGN PATENT DOCUMENTS 180797 6/1922 United Kingdom ............... 269/251

Primary Examiner—William R. Briggs
Attorney, Agent, or Firm—Don J. Flickinger

[57] ABSTRACT

A stationary base includes a planar surface and a bore having an axis lying in a plane parallel to the planar surface. A slide element having a planar surface slidably disposed against the planar surface of the base, is attached to a reciprocally movable shuttle slidably disposed within the bore.

4 Claims, 8 Drawing Figures

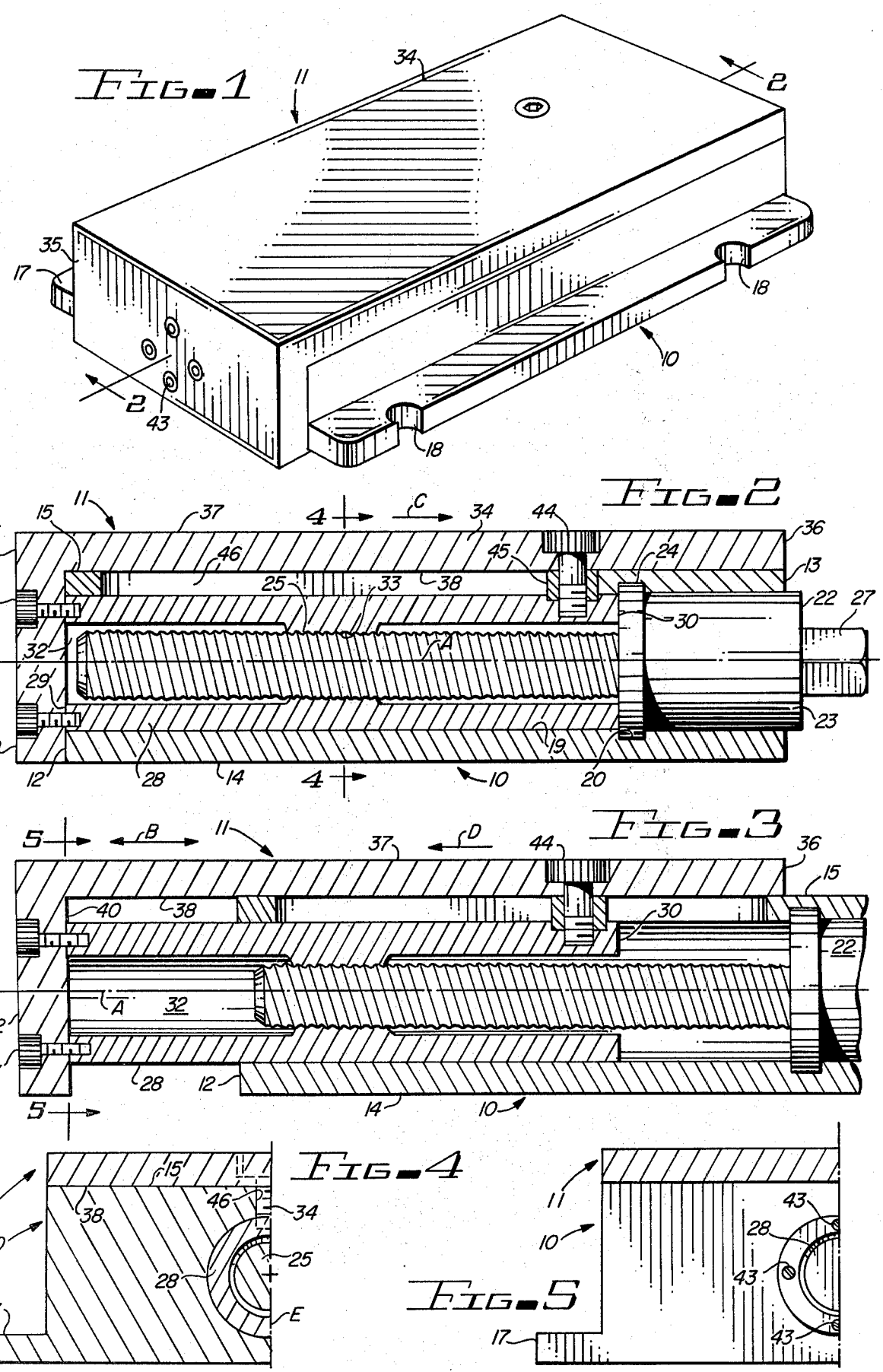

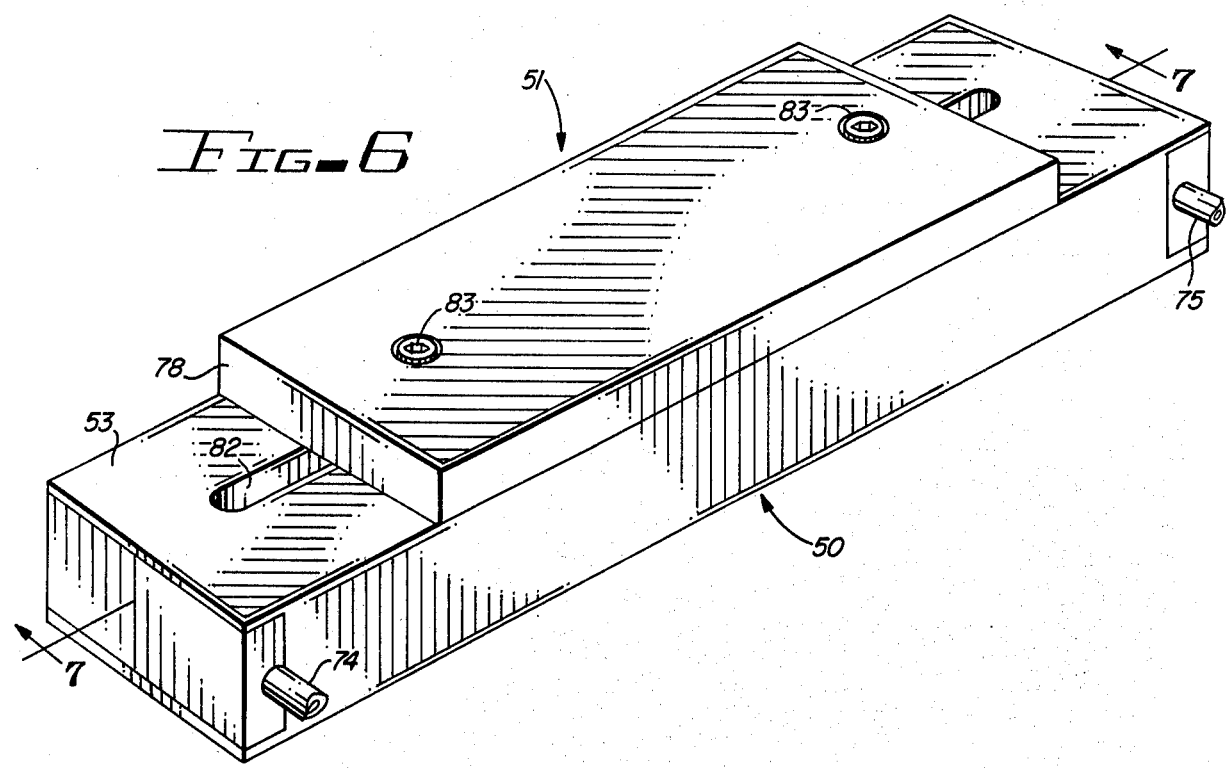
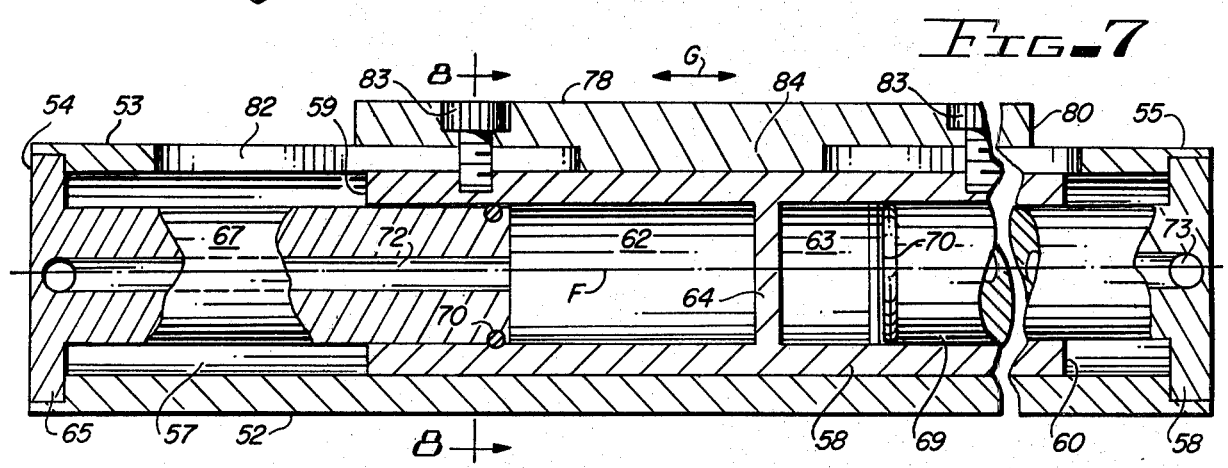
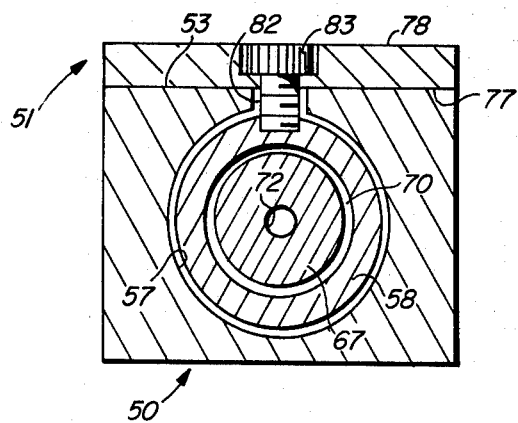

SLIDE MECHANISM

FIELD OF THE INVENTION

This invention relates to machine tool components.

In a further aspect, the present invention relates to work holding and supporting devices.

More particularly, the instant invention concerns a slide mechanism especially adapted for use in connection with machine tools.

PRIOR ART

Slide mechanisms are commonplace components of numerous well known machines and tools commonly used in various vocational and avocational fields for purposes of holding or supporting a work-piece while it is being acted upon. Exemplary are clamping devices and movable table structures.

The conventional milling machine, a popular machine tool normally found in metal working facilities, is typically representative of a device incorporating a slide mechanism for supporting a work-piece. That portion of the machine which comprises the slide mechanism is referred to as the table. Spaced above the table is the head which holds and rotates a cutting tool. The work-piece, carried upon the table, is shaped in response to movement of the table relative the cutting tool.

For precise machining of the work-piece, precision movement of the table is imperative. That is, the movement of the table must be along a true, accurate rectilinear path in controllable, precise increments. Further, inherent rigidity is mandatory to withstand the force of the machining or cutting operation.

In order to achieve the required accuracy and stability, the prior art has traditionally provided two sub-mechanisms, one for controlling direction of movement and one for causing movement. Direction of movement is usually guided and stabilized by an arrangement of square slides, V slides, dovetail slides or other way assemblies which interlock the table with the machine frame. Movement of the table is affected by a lead screw or other system entirely divorced from the way assembly.

The familiar vise typifies the use of a slide mechanism for purposes of gripping or holding. Based upon the stability of the movable jaw and upon the degree of alignment between the movable jaw and the fixed jaw, vises are generally classified as either utility or precision. The common bench vise, used for clamping rough work, is an exemplary utility vise. Fine work is usually held in a precision vise, such as during machining operations in a machine tool.

Commonly, precision vises and utility vises, analogous to the table of a machine tool, include means for guiding the movable jaw and, generally, separate means for causing movement of the jaw. Where precision is relatively unimportant, such as in the case of a utility vise, guiding is generally accomplished by a single way of square or circular cross-section. It is known, however, to combine the guiding and the moving mechanism in exceedingly crude devices. The stability of a precision vise is the result of a system similar to that of the previously described table of the milling machine.

The prior art is replete with various specific systems for slide mechanisms. In the attempt to provide stabilized, precision movement, the way systems have tended to be relatively complex. Further, the prior art has labored under the consideration that the guide means and the means for movement must be separate entities in a precision device. Accordingly, present precision slide mechanisms are complex and expensive to manufacture.

Therefore, it is an object of the present invention to remedy the foregoing and other deficiencies inherent in the prior art.

Another object of the invention is the provision of an improved slide mechanism.

Still another object of the invention is to provide a device for precision rectilinear reciprocal movement.

And another object of this invention is the provision of a slide mechanism which is adaptable for use as a machine tool component, such as a movable table or a vise jaw.

Yet another object of the invention is to provide simplified means for guiding a slide element relative a stationary base.

Still another object of the instant invention is the provision of a slide mechanism in which the means for causing movement are integral with the guide means.

A further object of the invention is to provide a slide mechanism which may be actuated by various means, such as mechanical or hydraulic.

And a further object of the immediate invention is the provision of a slide mechanism which is relatively unencumbered and durably constructed.

Still a further object of the invention is to provide a slide mechanism which is capable of accurate incremental movement.

Yet still a further object of this invention is the provision of a slide mechanism, according to the above, which is relatively inexpensive to manufacture.

SUMMARY OF THE INVENTION

Briefly, to achieve the desired objects of the instant invention, in accordance with a preferred embodiment thereof, first provided is a base having a planar surface. Next provided is a slide element having a planar surface slidably disposed against the planar surface of the base. Stabilizing means maintain the planar surfaces in sliding contact and guide the slide element during reciprocal movement relative the base.

In accordance with a more specific embodiment of the invention, the stabilizing means includes a bore formed within the base and having an axis lying in a plane parallel to the planar surface of the base. A shuttle is slidably disposed within the bore. Connection means affix the slide element to the shuttle. A preferred embodiment of the connection means comprises an elongate slot communicating between the planar surface of the base and the bore and extending along an axis parallel to the axis of the bore. A fastening element, such as a bolt, extends through the slot and interconnects the slide element with the shuttle. The slide element is reciprocally movable in response to actuating means of which the suttle is a component.

BRIEF DESCRIPTION OF THE DRAWINGS

The foregoing and further and more specific objects and advantages of the instant invention will become readily apparent to those skilled in the art from the following detailed description of preferred embodiments thereof, taken in conjunction with the drawings, in which:

FIG. 1 is a perspective view of a slide mechanism embodying the principles of the instant invention;

FIG. 2 is an enlarged vertical sectional view taken along the line 2—2 of FIG. 1, specifically illustrating the slide mechanism at a limit of travel;

FIG. 3 is a view generally corresponding to the illustration of FIG. 2, and illustrating the device thereof at an intermediate point of travel;

FIG. 4 is a vertical sectional view taken along the line 4—4 of FIG. 2;

FIG. 5 is a vertical sectional view taken along the line 5—5 of FIG. 3;

FIG. 6 is a perspective view of an alternate slide mechanism constructed in accordance with the teachings of the instant invention;

FIG. 7 is an enlarged broken vertical sectional view taken along the line 7—7 of FIG. 6; and FIG. 8 is a vertical sectional view taken along the line 8—8 of FIG. 7.

DESCRIPTION OF THE PREFERRED EMBODIMENTS

Turning now to the drawings in which like reference characters indicate corresponding elements throughout the several views, attention is first directed to FIG. 1 which shows a preferred embodiment of the instant invention having a base and a slide generally designated by the reference characters 10 and 11, respectively.

Base 10, as further seen in FIGS. 2 and 3, includes first end 12, second end 13, bottom surface 14 and top surface 15. Preferably, bottom surface 14 is flat for purposes of mounting the device upon the selected surface, such as the table of a machine tool. For this purpose, a mounting flange 17, having bolt receiving openings 18 therethrough, extend along either side of base 10. Top surface 15 is planar for purposes which will become apparent presently.

Bore 19 extends through base 10, being open at ends 12 and 13. Bore 19 is cylindrical about an axis designated by the reference character A which is parallel to planar surface 15. Annular recess 20 is formed in bore 19 proximate end 13. Lead screw 22 resides within bore 19 and is journaled for rotation about axis A by bearing surface 23. Annular shoulder 24, captively retained within recess 20, functions as a thrust bearing to prohibit axial movement of lead screw 22. Lead screw 22 further includes elongate threaded shaft 25 and stub 27 having flats for receiving a handle, wrench or other rotating device. Lead screws of the illustrated type, including the mounting and use thereof, are well known to those skilled in the art.

Shuttle 28, having first and second ends 29 and 30, respectively, and axial bore 32 extending therethrough, is slidably disposed within bore 19. For precision movement, it is recommended that shuttle 28 be received within bore 19 with a close running fit as will be readily understood by those having regard for the instant disclosure. Internal thread 33, residing at an intermediate location within bore 32, is matingly engaged with the external thread of shaft 25.

Slide 11 includes top plate 34 having first end 35, second end 36, upper surface 37 and undersurface 38. Undersurface 38, being planar, is received in sliding contact with planar surface 15. An attachment element, in the form of end plate 39, having inner surface 40 and outer surface 42, depends from first end 35 of top plate 34 over first end 12 of base 10. Bolts 43, extending through plate 34 and threadedly engaged within shuttle 28, secure slide 11 to shuttle 28 holding surface 40 in contact with end 12. Preferably, bolts 43 are of the socket head type with the heads being received within recesses within plate 39 to preserve the planeness of surface 42. It is further noted that the surface 42 is preferably perpendicular to axis A. The arrangement of bolts 43 as received within shuttle 28 is further seen in FIG. 5.

Slot 46, communicating between surface 15 and bore 19 of base 10, is elongate in a direction parallel to axis A. A fastening element, in the form of bolt 44, extends through slot 46 interconnecting, in accordance with conventional practice, slide 11 with shuttle 28. For purposes previously described, the head of bolt 44 is preferably recessed into top plate 34. Collar 45, encircling the shank of bolt 44, functions as a stand-off spacer to prevent crimping of base 10 between plate 34 and shuttle 28 as a result of over tightening of bolt 44.

Plate 39, bolts 43, bolt 44, collar 45 and slot 46 comprise connection means for affixing slide 11 to shuttle 28. The aforesaid connection means, in combination with shuttle 28 and lead screw 22, comprise stabilizing means for maintaining surface 38 in sliding contact with surface 15 and for guiding slide 11 during reciprocal movement along paths parallel to axis A. It is further noted that shuttle 28 and lead screw 22, which comprise actuating means for movement of slide 11, are integral with the stabilizing means.

As will be appreciated by those skilled in the art, slide 11 is caused to move along reciprocal paths defined by the double arrowed line B in response to selected rotation and counterrotation of stub 27. As lead screw 22 is rotated, shuttle 28 moves within bore 19 as thread 33 advances along threaded shank 25. Since slide 11 is connected to shuttle 28, corresponding movement is imparted thereto. FIG. 2 illustrates the slide mechanism of the instant invention as it would appear at the limit of travel in the direction of arrowed line C. FIG. 3 illustrates the mechanism as it would appear when approaching the limit of travel in the direction of arrowed line D.

With particular reference to FIG. 4, it is seen that surface 15 is maintained in sliding contact with surface 38. That is, slide 11 is stabilized and cannot rock or tip relative base 10. With particular reference to FIG. 4 and for purposes of illustration, it is assumed that a right triangle exists within the mechanism having a first leg lying along the line of contact between surfaces 15 and 38 and a second leg lying along vertical axis E, which is perpendicular to the first leg and passes through axis A. The limits of length of the second leg are defined by the intersection with the first leg and the intersection with axis A. The hypotenuse of the triangle may extend from the point of axis A to any point along the first leg. A similar mirror image right triangle exists on the other portion of the mechanism not illustrated. The two triangles, taken collectively, define the force of stability of the slide relative the base.

Any rocking or tipping of slide 11 relative base 10 would result in an angular separation between planer surfaces 15 and 38. Correspondingly, the triangles would be distorted, especially due to lengthening of the second leg. Since the components are rigidly affixed, such distortion cannot take place. It is seen therefore, that surface 15 is held into sliding contact with surface 38 as a result of the previously described stabilizing means. As previously discussed, the stabilizing means guides slide 11 in rectilinear reciprocation parallel to axis A.

The foregoing described embodiment of the instant invention has utility either as a vise jaw or as a movable table structure. As a vise jaw, surface 42 of plate 39 can be oriented to operate in opposition to a selected fixed jaw. As a movable table structure, work can be supported upon surface 37. For the latter purpose, T slots, tapped holes or other work holding expediencies may be formed into plate 34.

The embodiment of the invention illustrated in FIGS. 1–5 is directly, mechanically actuated by rotation of the lead screw. FIG. 6 illustrates an alternate embodiment of the instant invention in which the slide is movable in response to fluid pressure. The device is also adapted to be remotely controlled. In general similarity to the previously described embodiment, the immediate embodiment includes a base and a slide designated by the reference characters 50 and 51, respectively.

With further reference to FIG. 7, it is seen that base 50 includes bottom surface 52, top surface 53, first end 54 and second end 55. Top surface 53 is planar. Bore 57, having a longitudinal axis represented by the broken line F, extends through base 50 between ends 54 and 55. Axis F is parallel to the plane of planar surface 53.

Shuttle 58, having first end 59 and second end 60, is slidably disposed within bore 57. Preferably, for purposes of accuracy, shuttle 58 is held within bore 57 without perceptible play in what is commonly referred to as a close sliding fit. A first chamber 62 and a second chamber 63 are formed in shuttle 58 from first end 59 and second end 60, respectively. Chambers 62 and 63 may be considered to be a bore formed through shuttle 58 and divided by partition 64 intermediate the ends thereof.

First end plate 65, secured to end 54 of base 50, closes the respective end of bore 57. A stationary first piston 67 projects inwardly from first end plate 65. Similarly, a second end plate 68, having an inwardly projecting stationary second piston 69, is secured to second end 55 of base 50. Stationary pistons 67 and 69 are slidably received within chambers 62 and 63, respectively. A circular seal 70, such as a conventional O-ring carried in an appropriate groove by the piston, provides a fluid tight seal between each piston and the respective chamber.

A first fluid conduit 72 extends through first piston 67 and end plate 65. A second fluid conduit 73 extends through second piston 69 and second end plate 68. First conduit 72 communicates between first chamber 62 and supply line 74 while second conduit 73 communicates between second chamber 63 and supply line 75. Suplly lines 74 and 75 are connected to an available source of pressurized fluid and include appropriate valving as will be appreciated by those skilled in the art. As will be further recognized by those skilled in the art, conduits 72 and 73 alternately function as inlets and outlets, as controlled by remote valving, for movement of shuttle 58 along axis F in directions indicated by the double arrowed line G.

Slide 51 includes undersurface 77, upper surface 78 and first and second ends 79 and 80, respectively. Undersurface 77 is planar and abuts the top surface 53 of base 50 along a plane of sliding contact as best seen in FIG. 8. A slot 82, communicating between bore 57 and surface 53, is elongate in a direction parallel to axis F. Bolts 83, having heads recessed into surface 78, pass through slide 51 and threadedly engage shuttle 58 connecting slide 51 to shuttle 58 such that slide 51 moves with and as directed by shuttle 58. Lug 84 projects from the undersurface 77 of slide 51 abutting shuttle 58 and functioning in a similar manner as collar 45 as previously described in connection with the foreggoing embodiment.

The embodiment of the invention described in connection with FIGS. 7–8 is illustrated in a configuration especially adapted for use as a movable table structure for supporting a work-piece in connection with a machine tool. In general similarity to the embodiment described in connection with FIGS. 1–5, the latter embodiment is also suitable for use as a movable vise jaw. For this purpose, the length of slide 51 can be extended and incorporate a vertically disposed end plate to form the jaw proper as previously illustrated and described.

Various changes and modifications to the embodiments herein chosen for purposes of illustration will readily occur to those skilled in the art. For example, the embodiment of FIG. 6 is adapted to be constructed as a self-contained vise in which the fixed jaw is secured to first end 54 of base 50. Either embodiment is capable of controlled incremental movement in response to movement of the actuating means. A scale can be incoporated into either device for visual perception of the amount of movement. Various scales for this purpose are known within the art. To the extent that such modifications and variations do not depart from the spirit of the invention, they are intended to be included within the scope thereof, which is limited only by a fair interpretation of the following claims.

Having fully described and disclosed the present invention and alternately preferred embodiments thereof in such clear and concise terms as to enable those skilled in the art to understand and practice the same, the invention claimed is:

1. A slide mechanism for stabilized rectilinear reciprocation comprising:
 a. a base having a planar surface;
 b. a slide element having a planar surface slidably and continuously disposed against the planar surface of said base; and
 c. stabilizing means for guiding said slide element during reciprocal movement relative said base while maintaining the planar surface of said slide element in sliding contact with the planar surface of said base, said stabilizing means comprising:
  a bore formed within said base and having an axis lying in a plane parallel to the planar surface of of said base;
  a shuttle slidably disposed within said bore, said shuttle having a first end and a second end;
  an elongate slot communicating between the planar surface of said base and said bore and extending along an axis parallel to the axis of said bore;
  a fastening element extending through said slot and interconnecting said slide element with said shuttle at said first end thereof;
  an attachment element projecting from said slide element over an end of said base; and
  a plurality of connecting elements for affixing said attachment element to said second end of said shuttle.

2. The slide mechanism of claim 1, wherein said stabilizing means extends along an axis lying in a plane parallel to the planar surface of said base.

3. The slide mechanism of claim 1, further including actuating means for controlled selective reciprocal movement of said slide element relative said base.

4. The slide mechanism of claim 3, wherein said actuating means includes:

a. a lead screw having
   i. a bearing captively journaled within said base for rotation about an axis parallel to the axis of said bore,
   ii. an elongate externally threaded shaft extending axially from said bearing; and
b. a bore within said shuttle and having an internal thread matingly engaged with said threaded shaft, said shuttle being reciprocally movable within said bore in response to rotation of said lead screw in selective counter-directions.

* * * * *